US009733954B2

(12) United States Patent
Schechter et al.

(10) Patent No.: US 9,733,954 B2
(45) Date of Patent: Aug. 15, 2017

(54) MANIPULATING THUMBNAILS OF WINDOWS

(75) Inventors: Greg Schechter, Seattle, WA (US); Jevan Saks, Redmond, WA (US); Chris Fortier, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1096 days.

(21) Appl. No.: 12/701,344

(22) Filed: Feb. 5, 2010

(65) Prior Publication Data

US 2010/0138773 A1 Jun. 3, 2010

Related U.S. Application Data

(63) Continuation of application No. 11/111,983, filed on Apr. 22, 2005, now Pat. No. 7,673,255.

(51) Int. Cl.
*G06F 3/048* (2013.01)
*G06F 9/445* (2006.01)
*G06F 3/0481* (2013.01)
*G06F 3/0484* (2013.01)
*G06F 9/44* (2006.01)
*G06F 3/0482* (2013.01)

(52) U.S. Cl.
CPC ........ *G06F 9/4443* (2013.01); *G06F 3/04817* (2013.01); *G06F 3/0481* (2013.01); *G06F 3/0482* (2013.01)

(58) Field of Classification Search
CPC .. G06F 3/0481; G06F 3/04817; G06F 3/0482; G09G 5/14; G11B 27/34
USPC ........................................ 715/835, 838, 783
See application file for complete search history.

(56) References Cited

U.S. PATENT DOCUMENTS

| | | | |
|---|---|---|---|
| 4,651,146 A | 3/1987 | Lucash et al. | |
| 4,653,020 A | 3/1987 | Cheselka et al. | |
| 4,862,389 A | 8/1989 | Takagi | |
| 4,890,257 A | 12/1989 | Anthias et al. | |
| 5,333,256 A | 7/1994 | Green | |
| 5,412,776 A | 5/1995 | Bloomfield | |

(Continued)

FOREIGN PATENT DOCUMENTS

EP  1376430 A2  2/2004
EP  1 669 848  6/2006

(Continued)

OTHER PUBLICATIONS

Bell, Blaine A., et al, Dynamic Space Management for User Interfaces, Columbia University Department of Computer Science, Nov. 5-8, 2000.

(Continued)

*Primary Examiner* — Jordany Nunez
(74) *Attorney, Agent, or Firm* — Shook, Hardy & Bacon L.L.P.

(57) ABSTRACT

A dynamic thumbnail corresponding to an application window is displayed that is capable of being modified based on modifications in the application window. The modifications of the dynamic thumbnail may be accomplished in real-time. In some embodiments, a dynamic thumbnail is displayed in response to a user hovering a cursor over a taskbar button for a corresponding application window. In some embodiments, modifications to the dynamic thumbnail are reflected in the corresponding application window.

12 Claims, 13 Drawing Sheets

(56) References Cited

U.S. PATENT DOCUMENTS

| | | |
|---|---|---|
| 5,463,726 A | 10/1995 | Price |
| 5,499,334 A | 3/1996 | Staab |
| 5,546,528 A | 8/1996 | Johnston |
| 5,651,107 A | 7/1997 | Frank et al. |
| 5,657,463 A | 8/1997 | Bingham |
| 5,668,962 A | 9/1997 | Kitami |
| 5,712,995 A | 1/1998 | Cohn |
| 5,757,371 A | 5/1998 | Oran et al. |
| 5,758,110 A | 5/1998 | Boss |
| 5,841,435 A | 11/1998 | Dauerer et al. |
| 5,874,960 A | 2/1999 | Mairs et al. |
| 5,880,733 A | 3/1999 | Horvitz et al. |
| 5,889,517 A | 3/1999 | Ueda |
| 5,892,511 A | 4/1999 | Gelsinger et al. |
| 5,909,212 A | 6/1999 | Nishina et al. |
| 5,920,316 A | 7/1999 | Oran et al. |
| 6,008,809 A | 12/1999 | Brooks |
| 6,031,530 A | 2/2000 | Trueblood |
| 6,040,833 A | 3/2000 | Henshaw |
| 6,072,488 A | 6/2000 | McFarland |
| 6,606,105 B1 | 8/2003 | Quartetti |
| 6,724,403 B1 * | 4/2004 | Santoro et al. ............ 715/765 |
| 6,806,892 B1 | 10/2004 | Plow |
| 7,123,945 B2 | 10/2006 | Kokubo |
| 7,346,855 B2 | 3/2008 | Hellyar et al. |
| 7,478,326 B2 | 1/2009 | Holecek et al. |
| 2001/0028368 A1 | 10/2001 | Swartz et al. |
| 2002/0163545 A1 * | 11/2002 | Hii ............................. 345/838 |
| 2002/0170058 A1 | 11/2002 | Chang |
| 2003/0117440 A1 | 6/2003 | Hellyar et al. |
| 2003/0229894 A1 | 12/2003 | Okada |
| 2004/0268261 A1 | 12/2004 | Elliott |
| 2005/0019015 A1 * | 1/2005 | Ackley et al. ................ 386/95 |

FOREIGN PATENT DOCUMENTS

| | | |
|---|---|---|
| JP | 2000 105655 | 4/2000 |
| JP | 2003-099173 | 4/2003 |
| RU | 2202859 C2 | 4/2003 |
| WO | WO 03025899 | 3/2003 |

OTHER PUBLICATIONS

IronBytes, AltSwitch, Oct. 2004. http://web.archive.org/web/20041014013718/www.ironbytes.com/index.html.

Supplementary European Search Report for EP 05789924 dated Jan. 15, 2010.

European Search Report for Appl No. 12162133.8-2211, mailed Jun. 8, 2012.

"First Office Action Issued in Indian Patent Application No. 04436/CHENP/2007" mailed May 27, 2014, 2 pages.

* cited by examiner

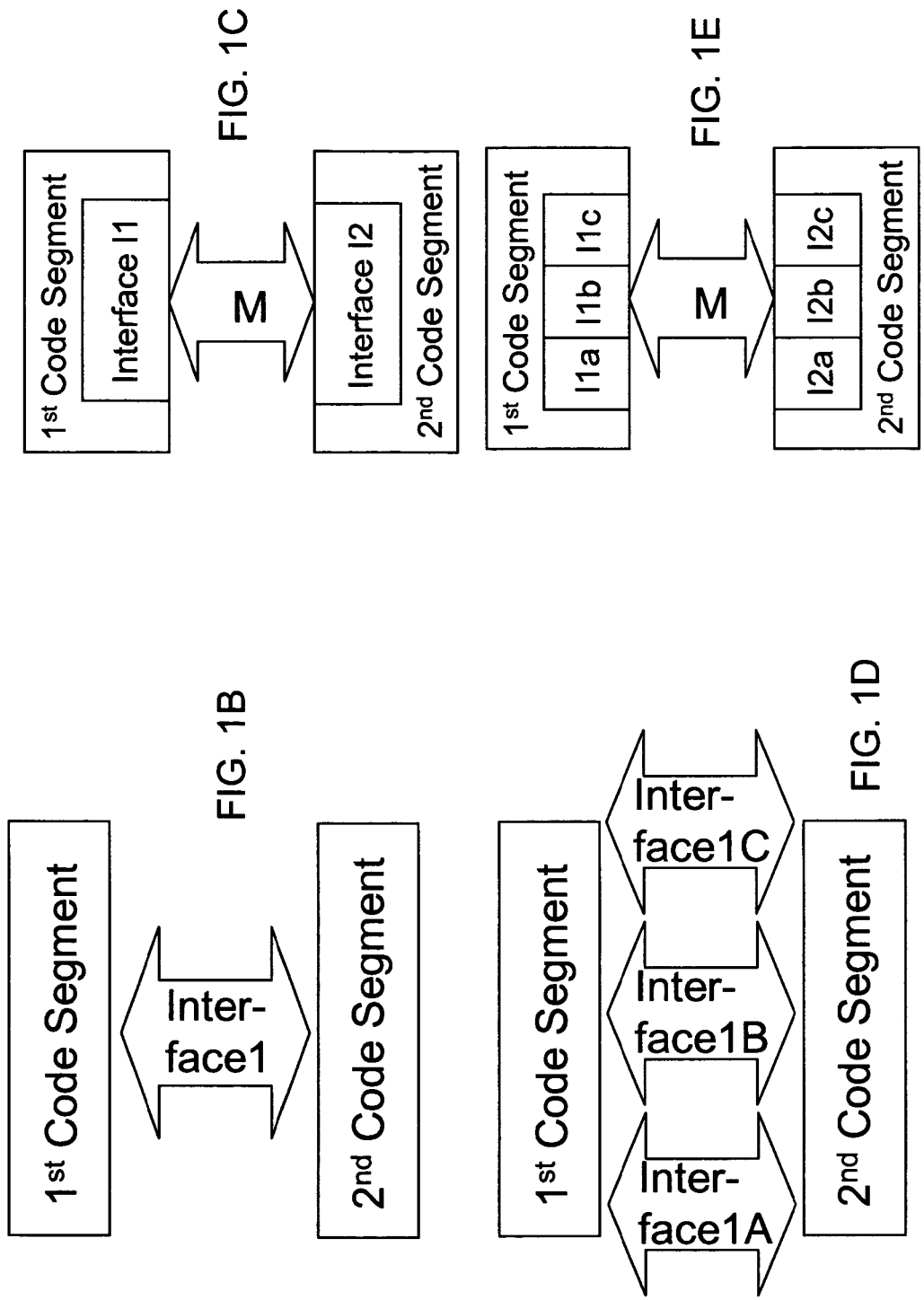

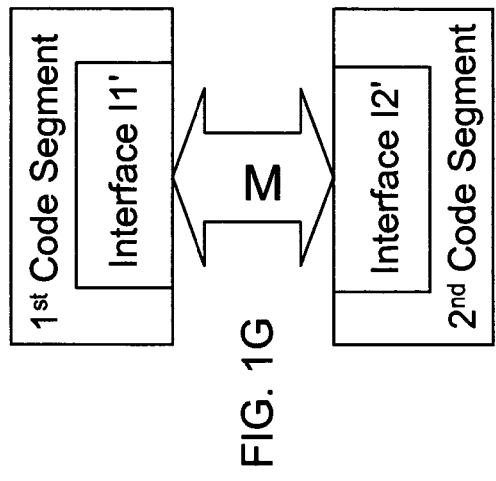
FIG. 1F
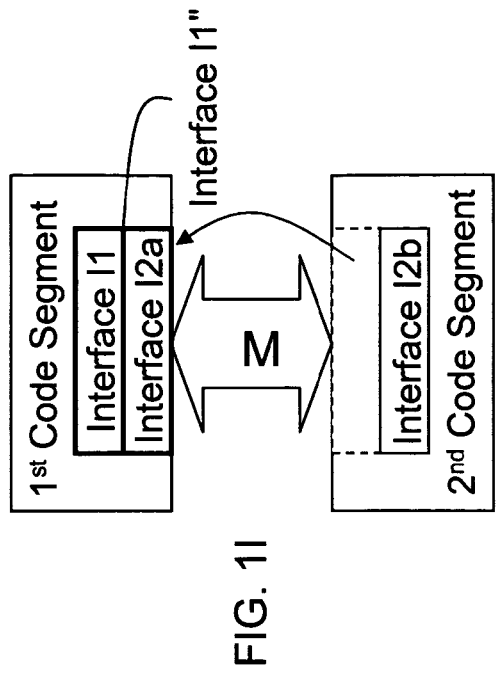
FIG. 1G
FIG. 1I
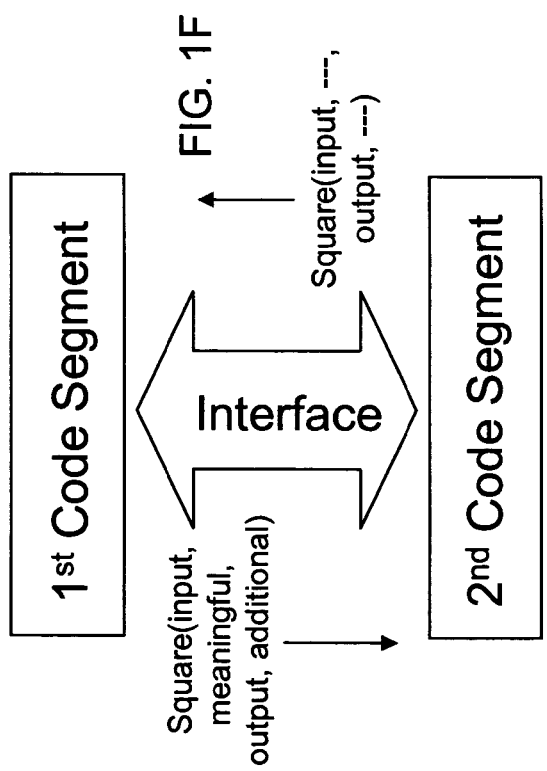
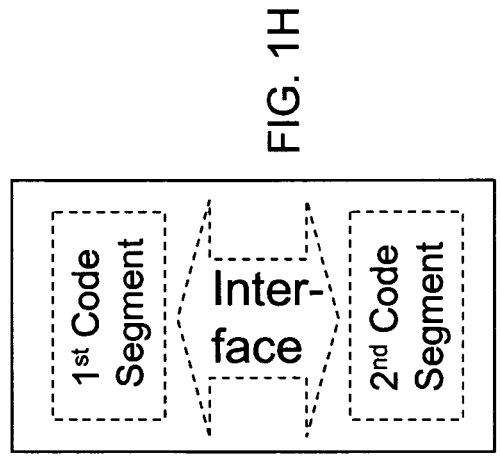
FIG. 1H

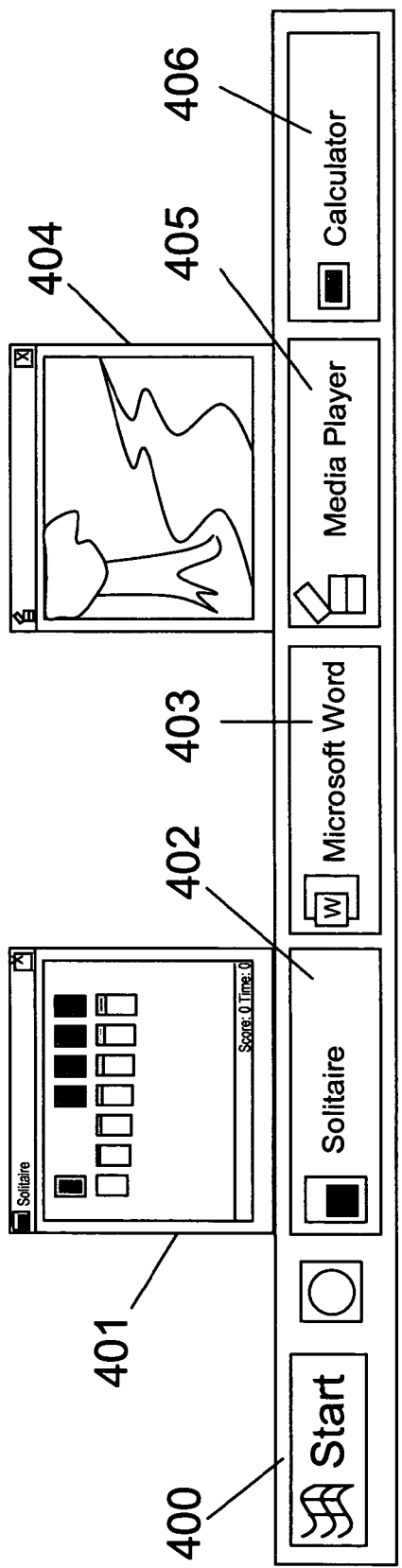
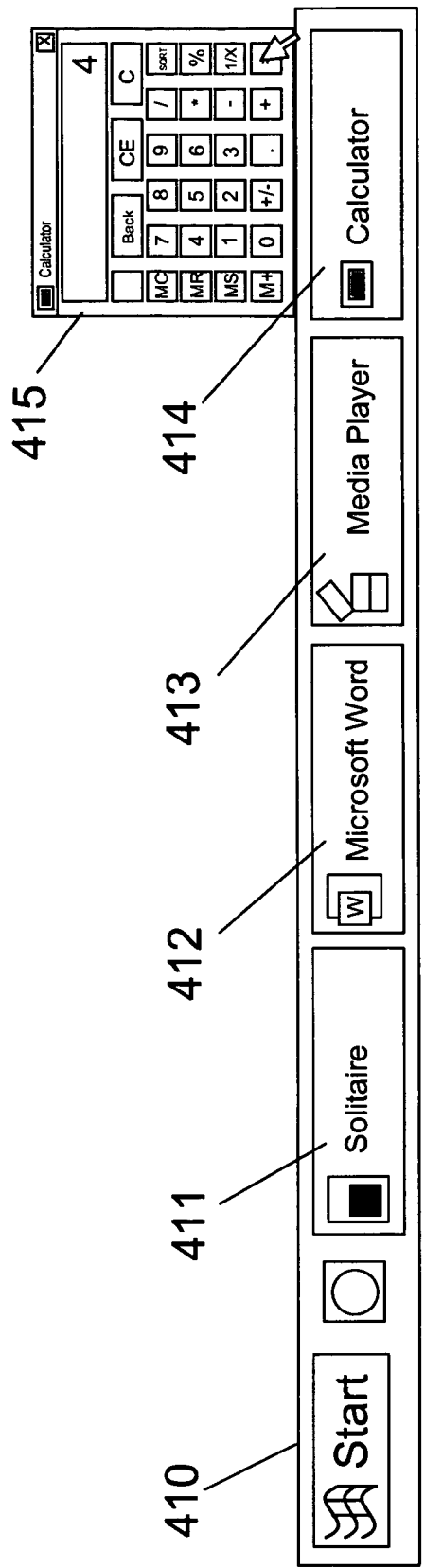
Fig. 4A
Fig. 4B

MANIPULATING THUMBNAILS OF WINDOWS

CROSS-REFERENCE TO RELATED APPLICATIONS

This application is a continuation of U.S. patent application Ser. No. 11/111,983, filed Apr. 22, 2005, the entire disclosure of which is hereby incorporated by reference.

BACKGROUND

Computer systems display a variety of windows into which users may input data, manipulate data or activate procedures. If running more than one application simultaneously, several windows may be displayed on the computer display, each window corresponding to an application. There may also be multiple windows for any one application. For example, if a user is entering text into a word processing program while also working in a spreadsheet program, there may be two windows open on the display. One of the windows is the word processing application window and the second window is the spreadsheet program window. If the user is additionally viewing a video on a media player application, there will be an additional window corresponding to the media player application. As the number of active applications increases, so does the number of windows that are displayed on the computer display.

A user who uses multiple applications simultaneously is often faced with a multitude of windows on the display causing a cluttered desktop leading to confusion and frustration from the clutter seen on the display. For example, there may be so many overlapping windows on the display that a user might have to waste time finding a desired window each time the user wishes to complete a task in a different application. To alleviate this problem, the user may minimize windows or quit applications altogether in order to decrease clutter (and the number of windows on the display). However, if windows are minimized, then the user no longer has immediate access to the corresponding application. If an action needs to be taken in a particular application in which the window has been minimized, the user must first locate the desired window and open the desired window after locating the window. This process is very time-consuming. Likewise, if the user quits the application altogether to clear desktop clutter, then the application is no longer active. In this case, the user must re-launch the application in order to complete the desired task and waste even more time. Also, if the application performs an ongoing function, that function is lost during the time the application was not active.

Typically, when an application window is minimized, a taskbar button may be displayed on a taskbar to indicate that the application is active. Although the taskbar button may indicate that the application is active, there is often only an icon or a name of the application in the taskbar button. Without additional information, the user would have to open the window to view the contents of the window. However, by opening and closing the window merely to check the contents of the window (e.g., to ascertain the identity of the window), the user wastes time and effort which causes a loss of efficiency and productivity. This problem is compounded when the number of active applications and number of windows increase as the user must open and close many windows to find the desired window.

Thus, there exists a need in the art for a system and method for providing convenient programmatic access to manipulating window or application thumbnails and expressing thumbnails in a manner to provide flexibility in the display of thumbnails and thumbnail content. Also, there is a need in the art for a programming interface and a method of implementing the programming interface to effectively manage and implement application windows and thumbnails and expressing the windows and thumbnails in a flexible fashion.

SUMMARY

Aspects of the present invention provide an interface, system, or method for displaying a window on a display thereby addressing one or more issues described above. A dynamic thumbnail corresponding to an application window is also provided in which modifications of content in an application window are reflected in the corresponding dynamic thumbnail. A modification of content of the application window may further be reflected in the corresponding dynamic thumbnail in real-time.

BRIEF DESCRIPTION OF THE DRAWINGS

FIGS. 1B through 1M show a general-purpose computer environment supporting one or more aspects of the present invention.

FIGS. 4A and 4B demonstrate one example of an application of the present invention in providing thumbnails of application windows.

DETAILED DESCRIPTION

Figure 1A:
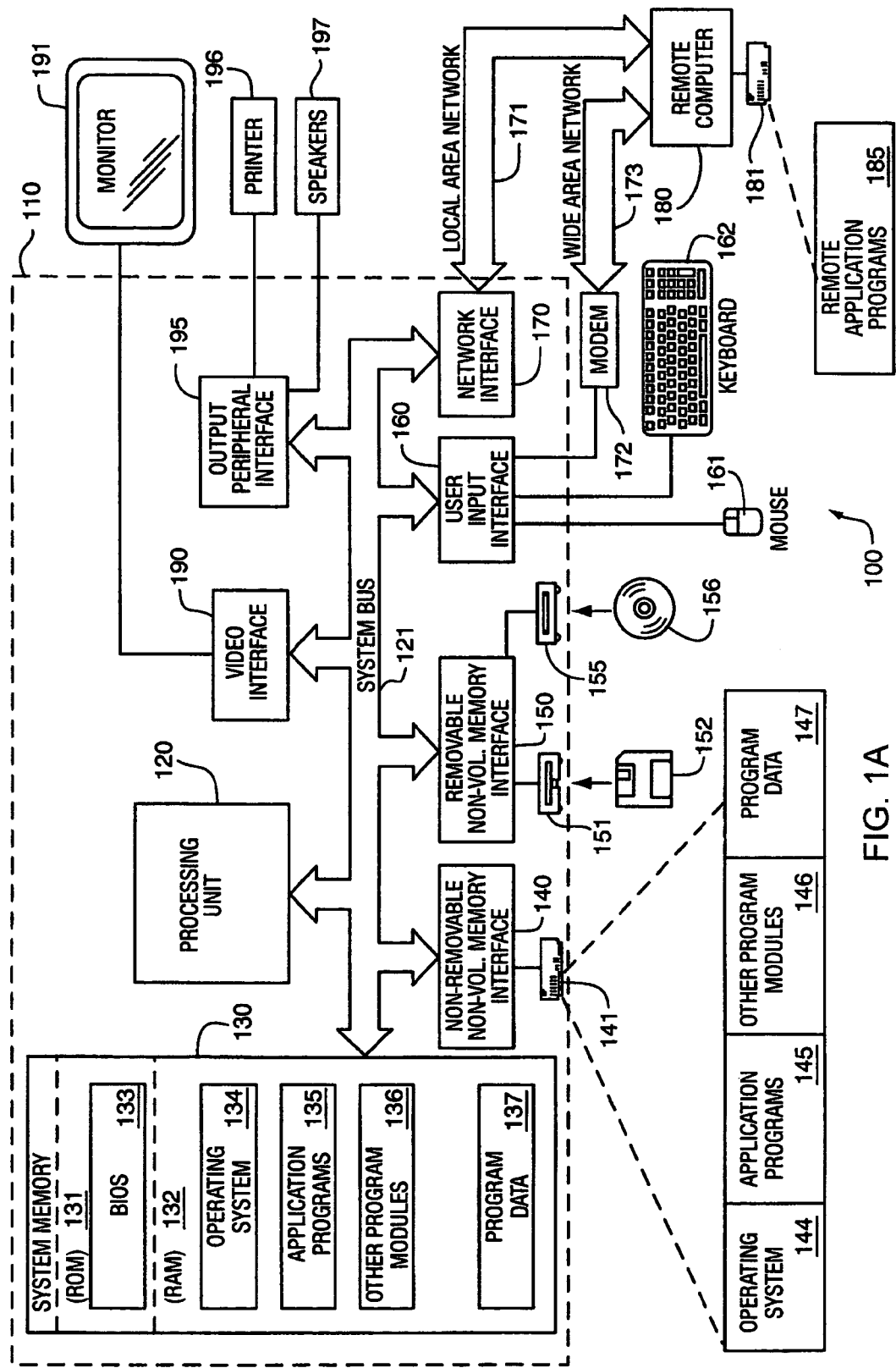
FIG. 1A illustrates an example of a system for implementing the invention which includes a general purpose computing device in the form of a computer.

This document is divided into sections to assist the reader. These sections include: Overview; General Purpose Computer Environment; Thumbnails.

It is noted that various connections are set forth between elements in the following description. It is noted that these connections in general and, unless specified otherwise, may be direct or indirect and that this specification is not intended to be limiting in this respect.

Overview

A. Static Thumbnails

In one approach, a thumbnail may be associated with the application. With a thumbnail, a small version of the application window may be displayed to indicate the original content of the application window, allowing the user to identify approximate content of the window. However, these thumbnails may not provide updated content of the application window. Thus, if modifications were made to the application window, the thumbnail may be outdated and may not provide the proper image of the actual content of the application window. Thus, it is difficult for the user to properly identify the application window desired without having to open the application window itself.

Also, thumbnails lack flexibility in terms of display of content, placement, sizing and/or effects. A thumbnail of an application window provides a static image of the original content of the application window. However, not only does the content remain static and potentially outdated, but also characteristics and placement of the thumbnail may be predetermined and may not vary based on the needs of the user at any given time.

Computer operating systems employ a software layer responsible for managing user interface objects such as thumbnails, and providing user interface services to software applications. The software layer may be referred to as the Desktop Window Manager (DWM). The rendering logic, input event routing, and application programming interfaces (APIs) of the Desktop Window Manager (DWM) collectively embody user interface policy, which in turn defines the overall user experience of the operating system. In rendering the desktop, the DWM typically processes screen updates, such as the moving of windows, by coordinating painting directly onto the display screen. Hence, if an overlapping window is closed or moved away, the newly displayed underlying window or desktop must be repainted. This is a slow process in which time and resources are needlessly wasted. Also, when windows are painted directly at a particular position and in a particular configuration on the display as is typically done, the corresponding image of the window is set at that particular position and configuration. Modifications to the window's position or configuration would require a large expenditure of resources to repaint the image.

B. Dynamic Thumbnails

In another aspect of the present invention, an interface, system, and method are provided for displaying a thumbnail on a display in which a Desktop Window Manager (DWM) provides an Application Programming Interface (API) that registers a source window and a destination window. In this example, the destination window is a window in which a thumbnail may be rendered. The thumbnail rendered within the destination window may represent at least a portion of a corresponding source window. Hence, the thumbnail may represent an association between the source window and the destination window by providing at least a portion of the source window drawn into at least a portion of the destination window. The DWM may receive a window handle (HWND) corresponding to the source window and an HWND corresponding to the destination window. The application may further receive a handle representing the registration of the thumbnail corresponding to the source window.

In another aspect of the present invention, an interface, system, and method are provided for displaying a thumbnail on a display in which a Desktop Window Manager (DWM) updates or modifies a thumbnail associated with a corresponding source window. In this example, the DWM may receive data defining a size of a destination window, a region of a source window to draw into a destination window as a thumbnail, opacity of a thumbnail, visibility of a thumbnail, special effects of a thumbnail, etc.

A further aspect of the present invention further provides a dynamic thumbnail comprising exporting an application programming interface for registering a thumbnail handle, maintaining a list of thumbnail registrations, drawing a thumbnail or destination window based on a source window, wherein the source window may be an application window, updating properties of a thumbnail, and unregistering the dynamic thumbnail. Further, modification to a source window may be handled automatically to effect a corresponding modification in a destination window.

It is noted that various connections are set forth between elements in the following description. It is noted that these connections in general and, unless specified otherwise, may be direct or indirect and that this specification is not intended to be limiting in this respect.

Aspects of the present invention provide an application programming interface (API), system and method for control of the display of display elements such as windows or other representation of windows such as thumbnails on a display. In one example of the present invention, an alternate version of an application window is a smaller version of the application window and is displayed on the display. The smaller version of the application window may be further displayed in a location on the display that is different from the original application window. Alternatively, the original application window may be minimized such that the original application window is not displayed while the smaller version of the application window is displayed on the display. Also, the smaller version of the application window may itself be minimized, for example, if additional space on the display is desired. While the alternate version of the application window may be a smaller version of the application as described, it is noted that the alternate version of the application window may be larger than the original application window or any other size depending on the needs of the user.

For example, the alternate version of the application window may be a thumbnail of the application window. A thumbnail is typically a small image or representation of a larger graphic, or a part of a larger image, corresponding to the application window. Thumbnail may also represent an association between a source window, providing the source or content of the thumbnail, and a destination window which may be a window in which the thumbnail provides the content from the source window. Thumbnails provide the advantage of the capability of displaying several windows at once in a convenient format while minimizing the use of space on the display. Also, thumbnails may be used in selecting and sorting images and windows more easily.

In another aspect of the present invention, the thumbnail or alternate version of the application window may be displayed on the display when requested. For example, hovering a cursor over a taskbar button may invoke the display of a thumbnail of the application window. In one example, the thumbnail is a dynamic thumbnail and may be modified as the original application window is modified. For example, changes made to the application window are reflected in the dynamic thumbnail corresponding to the application window. Such changes may be reflected in the dynamic thumbnail in real-time, for example.

In another aspect of the present invention, thumbnails or dynamic thumbnails may be arranged within another window, or destination window. For example, multiple dynamic thumbnails from different applications may be included on a destination window such that the destination window displays thumbnails from each of the different applications. Also, any of the dynamic thumbnails displayed in the destination window may reflect the current status of the corresponding application window. Alternatively, a thumbnail may be displayed in another thumbnail or thumbnails may be cascaded such that a first thumbnail may be displayed in a second thumbnail which may, in turn, be displayed in a third thumbnail, etc.

In yet another aspect of the present invention, a system and method is provided to prepare windows off-screen. Compositing the windows may then be accomplished on-screen thus saving computer resources. Also, preparing windows off-screen and compositing the windows on-screen enables thumbnail functionality as described in the present invention.

General Purpose Computing Environment

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1A, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply "interface") may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface.

Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or nonexistent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

Factoring

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

Inline Coding

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded inline with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

Divorce

Figure 1K:
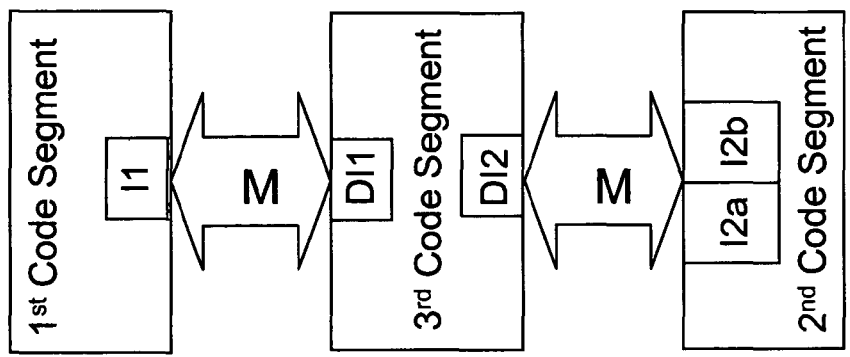
Figure 1J:
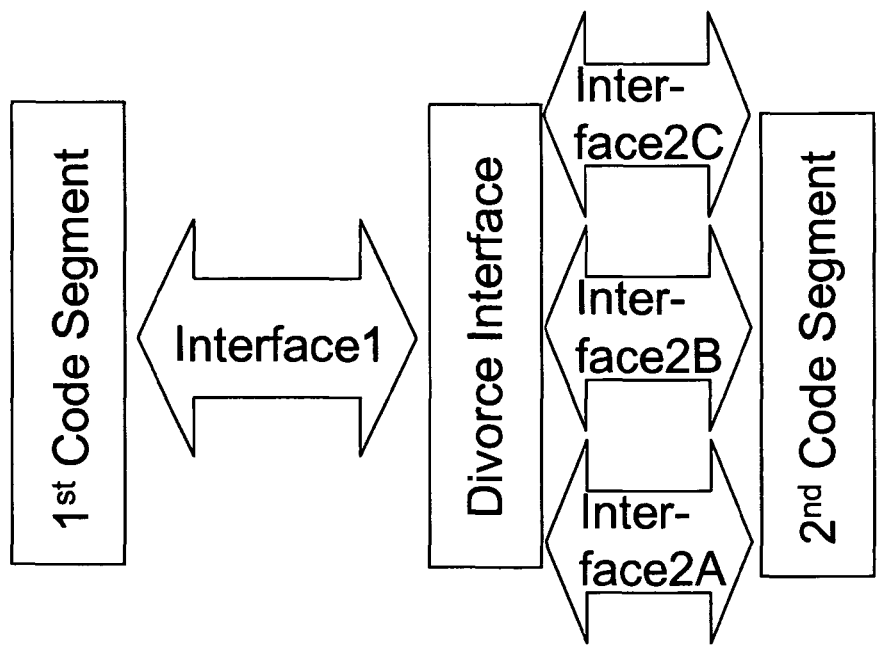

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

Rewriting

Figure 1L:
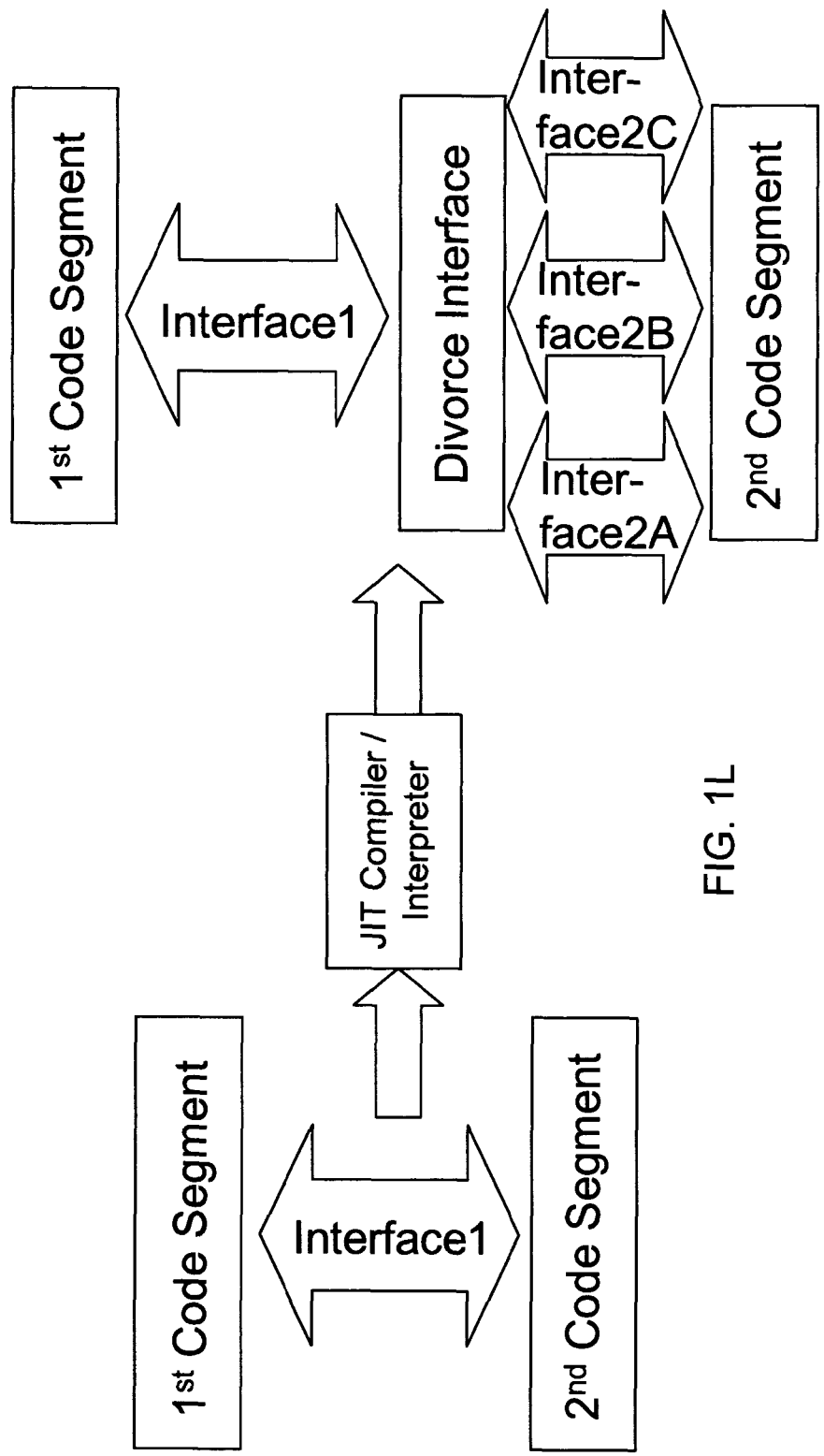
Figure 1M:
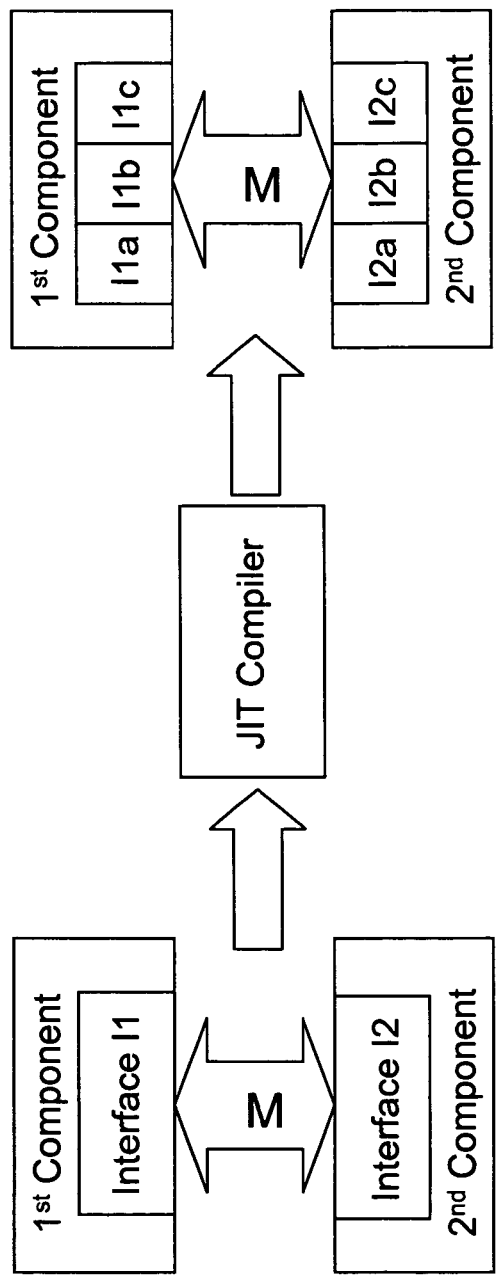

Yet another possible variant is to dynamically rewrite the code to replace the interface functionality with something else but which achieves the same overall result. For example, there may be a system in which a code segment presented in an intermediate language (e.g., Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface, which may not be described herein, but nonetheless are represented by the spirit and scope of the invention, i.e., it is noted that it is at least partly the functionality represented by, and the advantageous results enabled by, an interface that underlie the value of an interface.

Thumbnails

FIGS. 4A and 4B demonstrate one example of an application of the present invention in providing thumbnails of application windows. In the example of FIG. 4A, a taskbar 400 is illustrated that contains taskbar buttons. Each of the taskbar buttons corresponds to an active application. Taskbar button 402 corresponds to a Solitaire application program currently running on the computer. Likewise, taskbar button 403 corresponds to a word processing application program window, taskbar button 405 corresponds to a media player application program window and taskbar button 406 corresponds to a Calculator application program window. A Solitaire thumbnail 401 is provided for the Solitaire application program window and a media player thumbnail 404 is provided for the media player application program. The corresponding thumbnails may be invoked in a variety of ways. In one non-limiting example, thumbnails may be invoked by hovering a cursor over the corresponding taskbar button. For example, the Solitaire thumbnail 401 may be invoked by hovering the cursor over the Solitaire taskbar button 402.

Also illustrated in FIG. 4A, the dynamic thumbnails may provide updated or "live" content corresponding to the application program. For example, the media player application may be playing a video. As the video plays in the media player application window (not shown), the video also plays in the media player thumbnail 404. If the media player application window itself is minimized, the media player thumbnail 404 may display the last scene in the media player application window prior to minimizing. Alternatively, the media player thumbnail 404 may continue to display the video as it continues to play in the media player application even though the media player application window itself is minimized.

FIG. 4B illustrates another example of thumbnails of the present invention. A taskbar 410 is illustrated containing a Solitaire taskbar button 411 corresponding to a Solitaire application window (not shown), a word processing taskbar button 412 corresponding to a word processing application window (not shown), a media player taskbar button 413 corresponding to a media player application window (not shown) and a calculator taskbar button 414 corresponding to a calculator application window (not shown). In this example, a Calculator thumbnail 415 is provided. The Calculator thumbnail 415 displays the current and updated contents of the Calculator application window. In one embodiment of the present invention, the Calculator thumbnail 415 may also update the application window. For example, a calculation may be performed through the Calculator thumbnail 415 to achieve a mathematical result. This result can be displayed in the Calculator thumbnail 415 as well as the Calculator application window (not shown). In this example, the "=" key is selected in the Calculator thumbnail 415 and a result is displayed in the Calculator thumbnail (i.e., "4"). This result may also be reflected in the Calculator application window as well (not shown) even though the calculation was performed through the Calculator thumbnail 415.

Figure 5:
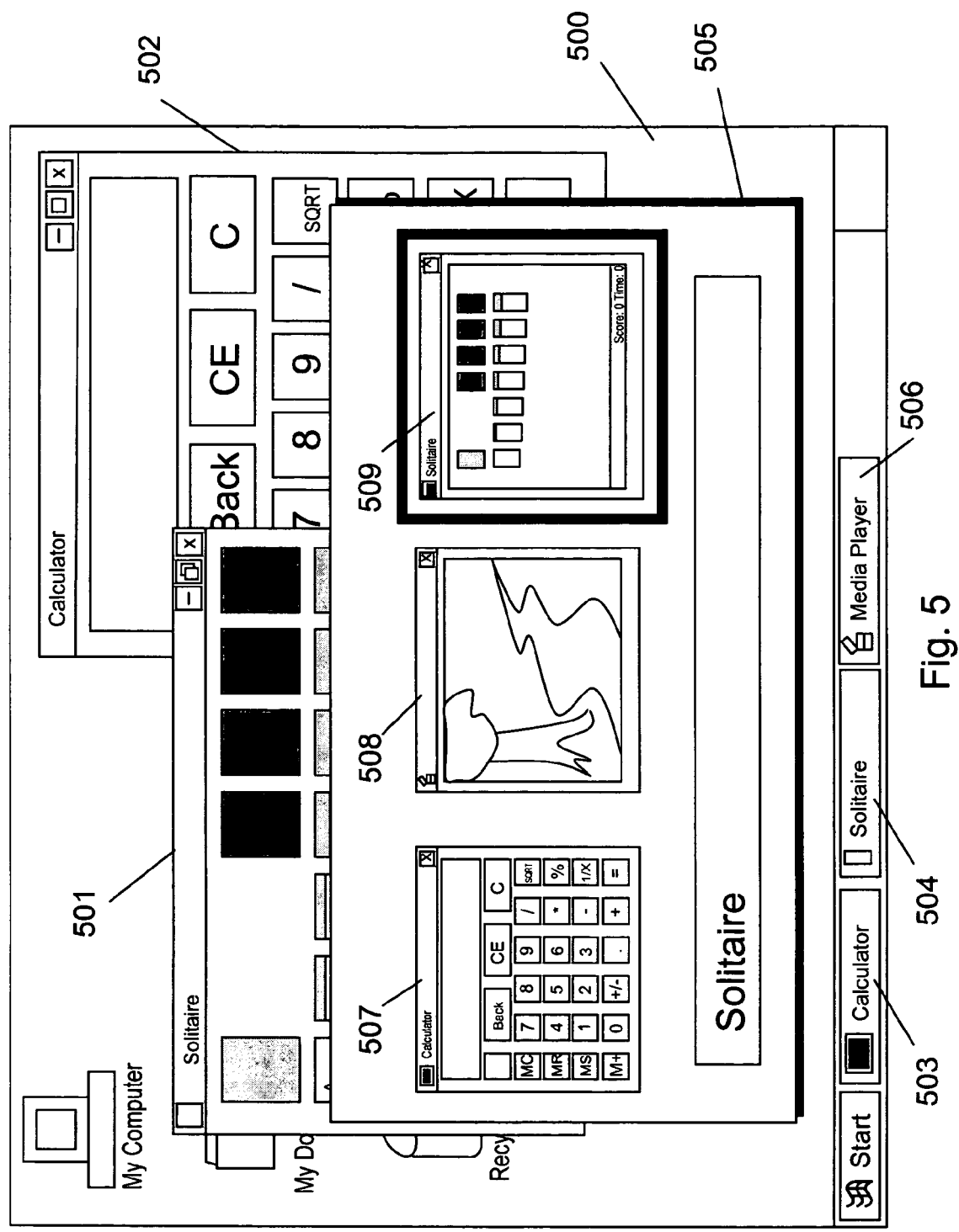
FIG. 5 illustrates another application of a thumbnail of the present invention in which thumbnails are displayed in an ALT-TAB menu.

FIG. 5 illustrates another application of a thumbnail of the present invention in which thumbnails are displayed in an ALT-TAB menu. As FIG. 5 illustrates, a display 500 displays application windows. In this case, a portion of a Calculator application window 502 and a portion of a Solitaire application window 501 are visible on the display 500. Each of the applications has a corresponding taskbar button in the taskbar. The Calculator application has a corresponding Calculator taskbar button 503 and the Solitaire application has a corresponding Solitaire taskbar button 504. A media player application is also active (not shown) and a corresponding media player taskbar button 506 is also present in the taskbar.

In the example illustrated in FIG. 5, an ALT-TAB menu 505 is provided that displays dynamic thumbnails of active applications. In this example, each of the dynamic thumbnails displays "live" (i.e., updated) content of a corresponding application window. The dynamic thumbnail content may be updated in real-time. As application windows are modified or updated, the corresponding dynamic thumbnail may also be updated accordingly. Updating of the dynamic thumbnail may also be accomplished in real-time. In this example, the ALT-TAB menu 505 contains a dynamic thumbnail of each of the active applications, whether the application window of the corresponding application is visible on the display or not. A Calculator thumbnail 507, media player thumbnail 508 and Solitaire thumbnail 509 are illustrated in the ALT-TAB menu 505 with the Solitaire thumbnail 509 being selected. Each of the dynamic thumbnails may provide "live" content. For example, a video may be playing in the media player thumbnail 508 in real-time.

Figure 2A:
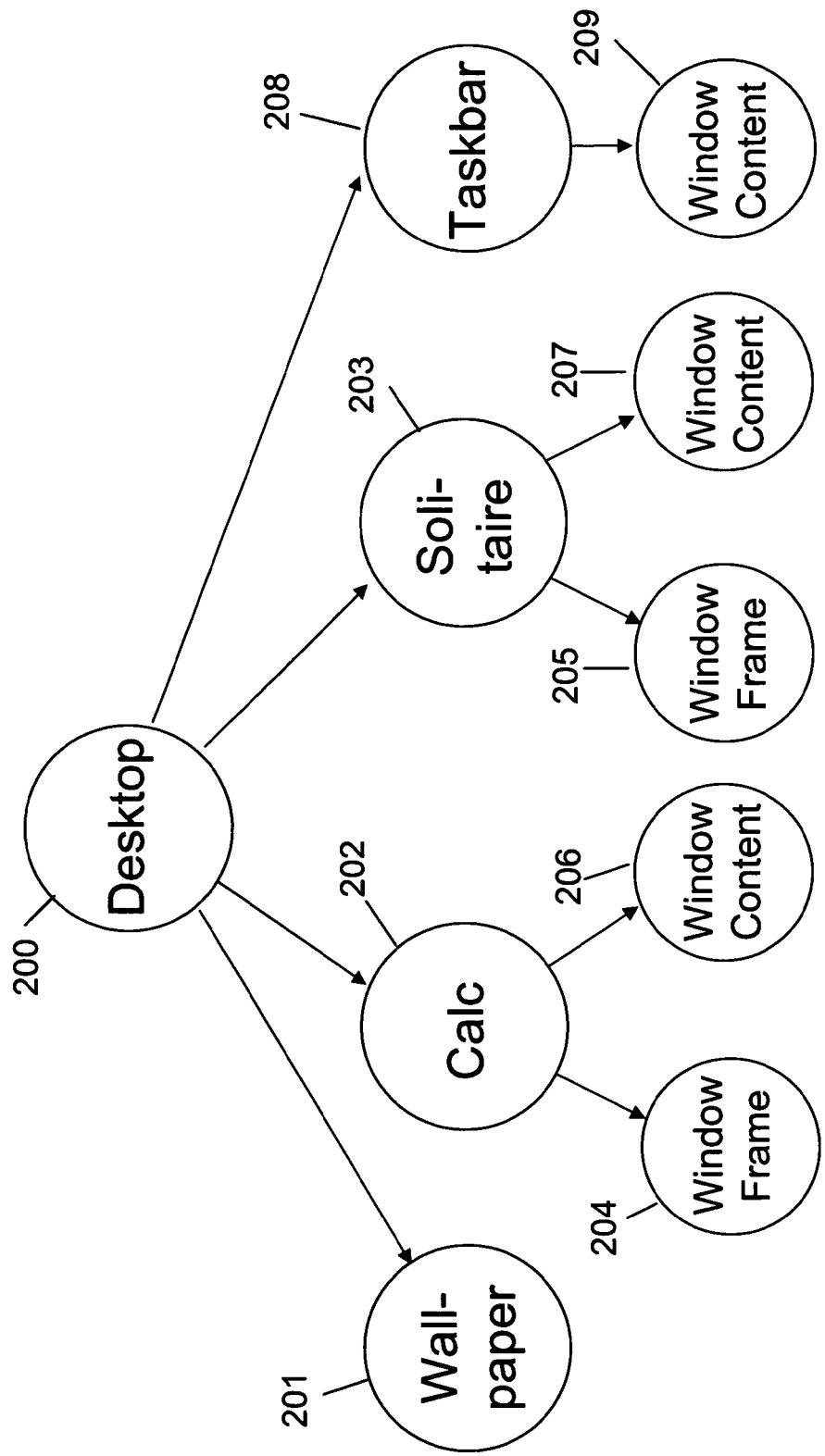
FIG. 2A is a scene graph or display tree diagram illustrating an example of components of a display.
Figure 2B:
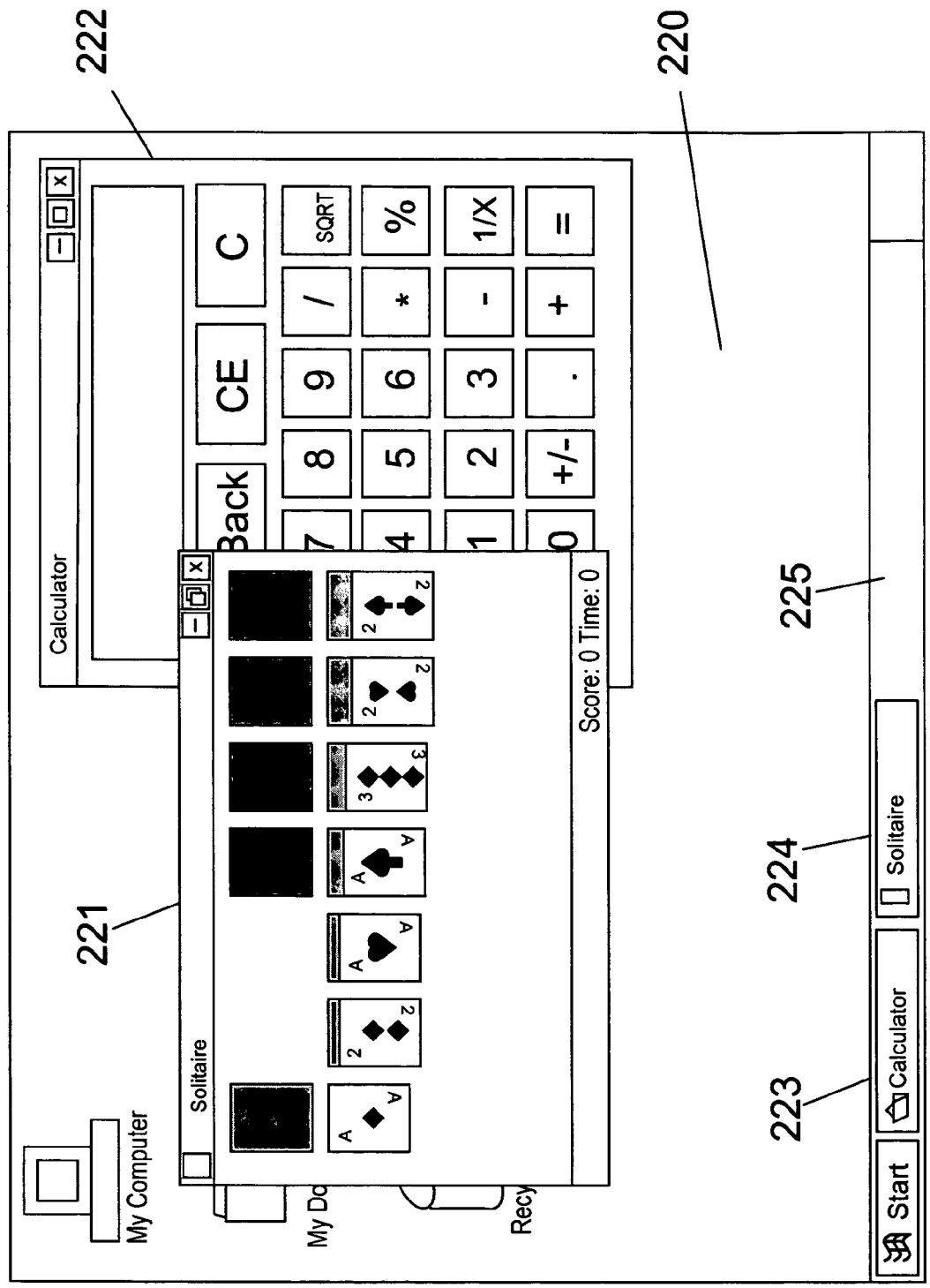
FIG. 2B demonstrates components of a sample display corresponding to FIG. 2A.

FIGS. 2A and 2B are diagrams illustrating components of a sample display. The desktop is represented in FIG. 2A in a scene graph or display tree as element 200 and contains the desktop wallpaper 201 and two applications, Calculator 202 and Solitaire 203. In addition, the desktop further contains a taskbar 208. In this method of representation, frames around windows and the client area of each window are all part of the scene graph. Window movement becomes changing transformation values in the display tree. Each of the applications in this example contains a window frame 204, 205, respectively, and window content 206, 207, respectively. The taskbar 208 contains window content 209. In FIG. 2A, elements on the display are rendered from left to right. Hence, the desktop wallpaper 201 is rendered behind the Calculator 203 application window, which is rendered behind the Solitaire 202 application window.

FIG. 2B illustrates the display as represented in FIG. 2A. The display contains the desktop wallpaper 220 in the background. The Calculator application window 222 is displayed in front of the desktop wallpaper and the Solitaire application window 221 is displayed in front of the Calculator application window 222 and the desktop wallpaper 220. As shown in FIG. 2B, each of the application windows may be represented by taskbar buttons in the taskbar 225. In this example, the Calculator application is represented by taskbar button 223 in the taskbar 225 and the Solitaire application program is represented by taskbar button 224 in the taskbar 225. Each of the Calculator application window 222 and the Solitaire application window 221 contains a window frame and window content as displayed on the Desktop Wallpaper 220.

Any subnode of the tree as depicted in FIG. 2A may be used as the content of another node of the tree. By doing so, the contents of one part of the tree may be viewed at another location elsewhere in the tree. There are many methods of achieving a rendition of a node in the tree at another location elsewhere in the tree. As one non-limiting example, Visual Brush may be used. "VisualBrush" is a technique used to reference an existing part of the scene graph, but to render it with the "current" set of graphics context, such as position, scale, rotation, opacity, effect, etc. This causes a portion of the tree rendered in one place to be rendered elsewhere. For example, if a dynamic thumbnail of the Calculator application window is desired, an appropriate programming interface (e.g., an Application Programming Interface or API) may be called to provide a Thumbnail Host HWND or window handle. This example is demonstrated in FIGS. 3A and 3B.

Figure 3A:
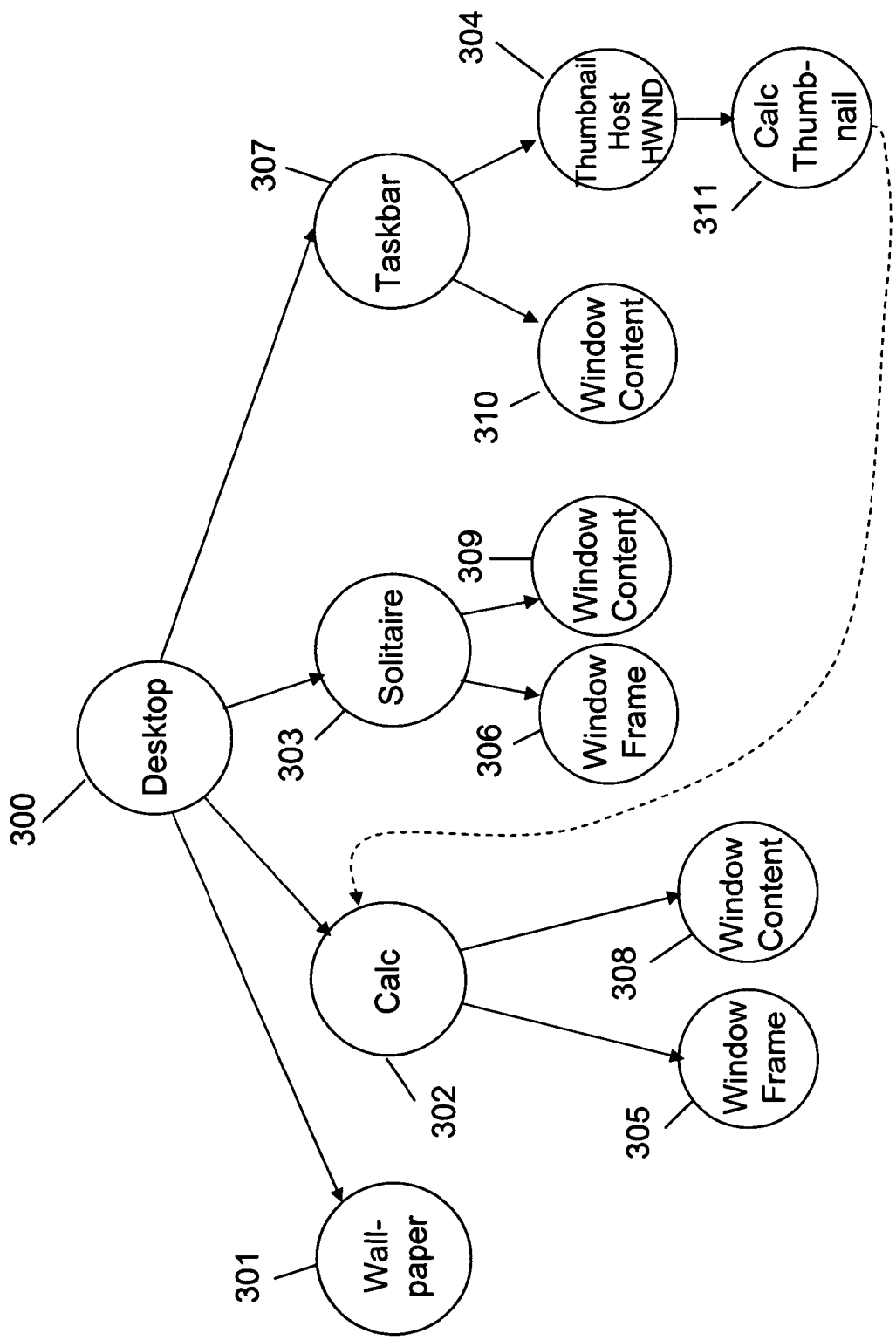
FIG. 3A is a scene graph or display tree diagram illustrating an example of components of a display of the present invention.

FIG. 3A is a scene graph or display tree diagram illustrating an example of components of a display of the present invention. The desktop is represented in FIG. 3A as element or node 300 and contains the desktop wallpaper 301 and two applications, Calculator 302 and Solitaire 303. Each of the applications in this example contains a window frame 305, 306, respectively, and window content 307, 308, respectively. The desktop in this example further contains a taskbar 307.

In this example, a thumbnail of the Calculator application window is provided by calling an appropriate API. As illustrated in FIG. 3A, a Thumbnail Host HWND 304 window handle is created by an application and may register a thumbnail of an application such as the Calculator application. For example, in FIG. 3A, the taskbar 307 contains a Thumbnail Host HWND 304 and window content 310. The Thumbnail Host HWND 304 contains a Calculator thumbnail 311 and may attach a thumbnail of the application window to the thumbnail host. The dotted arrow in FIG. 3A illustrates that the Calculator thumbnail 311 of the Thumbnail Host HWND 304 points back or redraws the Calculator from the Calculator application window. As a result, a "live" or dynamic thumbnail is provided that presents updated content of the corresponding application window (in this case, the Calculator application window) rather than merely static views of the application window content.

Figure 3B:
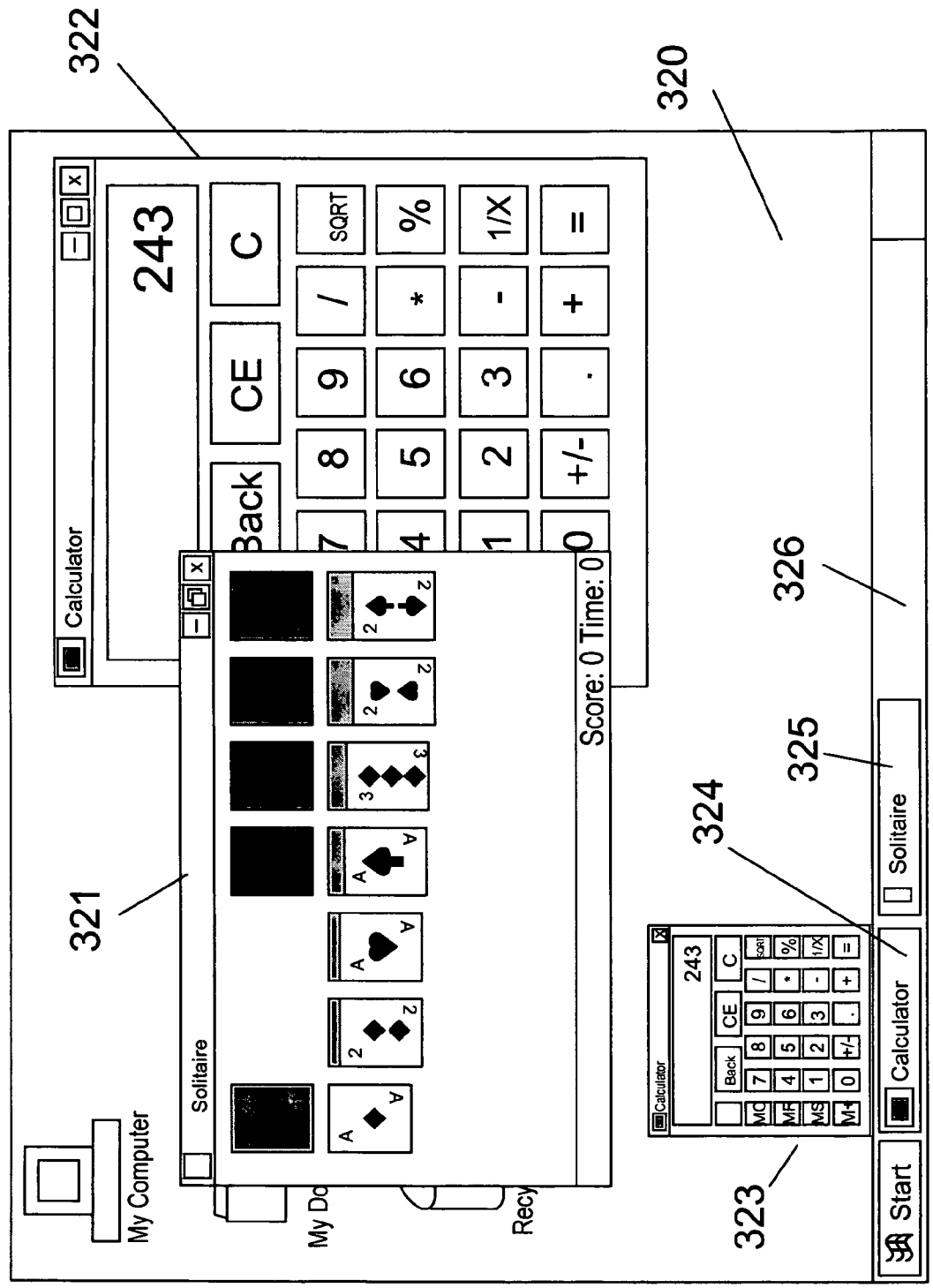
FIG. 3B demonstrates the display corresponding to FIG. 3A.

As in the example of FIG. 2A, the elements on the display represented in FIG. 3A are rendered from left to right. Hence, the desktop wallpaper 301 is rendered behind the Calculator 302 application window, which is rendered behind the Solitaire 303 application window and the taskbar 208. FIG. 3B demonstrates the display corresponding to FIG. 3A. As FIG. 3B illustrates, the display contains the desktop wallpaper 320 in the background. The Calculator application window 322 is displayed in front of the desktop wallpaper 320 and the Solitaire application window 321 is displayed in front of the Calculator application window 322 and the desktop wallpaper 320. Also displayed is the taskbar 326. Each of the applications is associated with a corresponding taskbar button in the taskbar 326. In this example, the Calculator application is associated with Taskbar button 324 and the Solitaire application is associated with taskbar button 325. In addition, FIG. 3B illustrates that a thumbnail is provided that is associated with the Calculator application. The Calculator application program and window 322 is associated with taskbar button 324 in the taskbar 326 and the Solitaire application program and window 321 is associated with taskbar button 325.

Also illustrated in FIG. 3B is a dynamic thumbnail 323 of the Calculator application window 322. The thumbnail 323 is provided by the Calculator Thumbnail node 311 of Thumbnail Host HWND 304 that points back or redraws the window frame 305 and window content 308 of the Calculator application 302 as depicted in FIG. 3A. The result is a dynamic thumbnail 323 of the Calculator application window 322 that is "live," i.e., the thumbnail is modified as corresponding modifications are made to the application window itself. As illustrated in FIG. 3B, the value of "243" calculated in the Calculator application window 322 is also reflected in the corresponding thumbnail 323.

In an aspect of the present invention, the dynamic thumbnails are achieved via registration, unregistration and updating properties of the thumbnails. Such registration, unregistration and updating properties or modification of thumbnails may be accomplished through application programming interfaces (APIs) in the Desktop Window Manager (DWM). Three exemplary APIs are described to achieve the thumbnails of the present invention.

API Example 1—Registration of the Thumbnail

A thumbnail may be generated from a window, for example, an application window. The application window, in this case, is the source window as the application window provides the basis for the content of the thumbnail. In one example, the thumbnail is a miniaturized version of the application window and contains the entire contents of the application window. Alternatively, the thumbnail may contain only a selected portion of the source window.

The content of the thumbnail from the source window is rendered into a second area. This second area is designated the destination window, which accommodates the content of the thumbnail based on the source window. The destination window may form the basis of the thumbnail itself. For example, a small window frame in a location other than the application window, a designated area in the display, or a pop-up menu may be used as the destination window to display the thumbnail based on the application window.

When a thumbnail is registered, an operation may be performed that establishes the relationship between the source window and the destination window. A window handle (HWND) may be specified that designates the destination window. The destination window specified may serve as the target of thumbnail rendering and is owned by the process calling or registering the thumbnail. If the process registering the thumbnail also owns the destination window, then unwanted alterations in the application by other applications can be avoided. Similarly, an HWND for the source window may also be specified.

The size of a cached bitmap of the thumbnail may also be specified. For example, a minimum size may be indicated such that the system is informed of the last known bitmap of the source window. In this way, if the source window is subsequently minimized and is not visible on the display, a bitmap of the window is nevertheless retained and the thumbnail is still available. The size may vary based on the needs of the calling application. If there are multiple registrations of the same source window, a process may determine which thumbnail size will apply based on the present needs. For example, in the case of multiple registrations of varying thumbnail size, the largest size may be used.

The API may also contain a handle representing the registration of the thumbnail. This handle may be unique to the process that is issuing the call such that the thumbnail may be subsequently unregistered only from the process with which it was registered.

An example of an API for registering a thumbnail is as follows:

```
Typedef HANDLE HTHUMBNAIL;
HRESULT
DwmRegisterThumbnail (
        HWND           dstWindow,
        HWND           srcWindow,
        SIZE           *lpMinimizedSize
        OUT HTHUMBNAIL *lphThumbnail
);
```

In which dstWindow represents the destination window, srcWindow represents the source window, 1pMinimizedSize represents the size at which the system caches the last known bitmap of the source window (srcWindow) once srcWindow is minimized and 1phThumbnail is a returned value representing the unique handle representing the registration made in the call.

API Example 2—Modifying or Setting Thumbnail Properties

After thumbnail registration, content from the source window, or portion thereof, is placed as the thumbnail in the destination window. For example, when called, an Update thumbnail properties API may modify or update properties of the rendering of the thumbnail in a destination window. For example, UpdateThumbnail Properties may be used to set properties of thumbnails such as visibility, shape, rectangles, etc. An Update thumbnail properties API may indicate the handle of a thumbnail to be updated. Updates to thumbnails include any modification of the thumbnail, including but not limited to positioning of the thumbnail, size of the thumbnail, portion of the source window to be used for the thumbnail, portion of the destination window to be used for the thumbnail, opacity or transparency of the thumbnail, visibility of the thumbnail, special effects of the thumbnail (e.g., twirl, distort, shatter, etc.), etc.

In another example, thumbnails may be updated or modified from the processes in which they were registered. In one example, a thumbnail handle is repeatedly called to a destination window such that the thumbnail may be moved around the destination window. In this case, the thumbnail may be repositioned within the destination window. For example, in an ALT-TAB window, the thumbnails may be rearranged in varying order by recalling the thumbnail to the destination window.

Parameters may be used in modifying or setting thumbnail properties. There are many examples of parameters for modifying or setting thumbnail properties such as but not limited to flags. Through the use of the parameters, the API structure may be more easily modified making the API more flexible for future upgrades. The parameters may designate properties of the thumbnail to be used and may themselves be defined by specified constants. For example, the parameters may define and correspond to a source window parameter that defines an area or portion of a source window to be used as a thumbnail in a destination window when less than the entire source window is desired to be used for the thumbnail. In this example, only the specified portion of the source window as indicated by the source window parameter is used for the thumbnail in the destination window. In one example, the portion of the source window to be used as the thumbnail in the destination window is specified as coordinates of the display. For example, if the desired portion is a rectangle within the source window, the API may specify a parameter to indicate the coordinates of an intersecting rectangle with the source window to obtain the final rectangle to be used as the thumbnail. As an example, the coordinates (0, 0) may be set as the upper left corner of the window area. A parameter defining and corresponding to the desired source window parameter may be set in order to indicate that only a specified portion of the source window is to be used as the thumbnail, the specified portion of the source window being defined in terms of the coordinates provided. Although there are many ways in which to specify the coordinates and the desired portion of the source window, one example may include using the portion of the source window defined by the intersection of the provided rectangle with the intersected actual source window.

Also, the portion of the destination window to be used for the thumbnail may be specified via a parameter that defines and corresponds to a destination window parameter. In this case, if the entire destination window is not desired to be used for the thumbnail and only a portion of the destination window is to be used for the thumbnail, then the area of the destination window into which the thumbnail may be rendered may be specified by the destination window parameter. If this is the case, one approach would be to render only within the desired designated area as defined by the destination window parameter (i.e., clipping of the image when rendering occurs outside of the designated area). Also, one method of determining the location of the portion of the destination window into which the thumbnail may be drawn is to determine the intersection of the portion of the destination window to be used and the destination window itself. This prevents rendering outside of the designated area. Further, a parameter defining and corresponding to a destination window parameter may be used to designate an area within the designated area to be used as a thumbnail from the source window. In this example, if a destination window parameter is not defined, the entire designated window may be used for the thumbnail content.

Any number of other thumbnail properties may be specified in the API. For example, opacity or transparency of the thumbnail may be specified. In one aspect of this example of the present invention, a parameter may be assigned to designate the opacity (or transparency) of the thumbnail, e.g., 255 may be assigned as fully opaque while 0 may be assigned as fully transparent. Thus, if a parameter defining and corresponding to an opacity parameter is set, a designated assigned numerical value for opacity of the thumbnail may be applied. As a result, the thumbnail may exhibit varying degrees of opacity as desired by a user.

As an additional example, the thumbnail may be made visible or invisible as needed. A parameter defining and corresponding to a visibility parameter may be provided. The visibility parameter may be a Boolean value such that when the visibility parameter is TRUE, the thumbnail is made visible while the thumbnail is made invisible if the visibility parameter is FALSE. The present invention is not limited to any particular modification of the thumbnail as any modification of the thumbnail is within the scope of the present invention.

An example of an API for updating or modifying a thumbnail is DwmUpdateThumbnailProperties as follows:

```
HRESULT
DwmUpdateThumbnailProperties (
            HTHUMBNAIL hThumbnail,
            DWM_THUMBNAIL-PROPERTIES *ptnProperties
);
#define DWM_TNP_RECTDESTINATION 0X00000001
#define DWM_TNP_RECTSOURCE 0X00000002
#define DWM_TNP_OPACITY 0X00000004
#define DWM_TNP_VISIBILTIY 0X00000008
typedef struct _DWM_THUMBNAIL_PROPERTIES
{
            DWORD    dwFlags;
            RECT     rcDestination;
            RECT     rcSource;
            BYTE     opacity;
            BOOL     fVisible;
} DWM_THUMBNAIL-PROPERTIES;
``` where dwFlags define parameters or flags corresponding to parameters that specify subsequent properties to be used. In this example, the rcSource parameter is a source window parameter that specifies the region of the source window (srcWindow) to use as the thumbnail, rcDestination is a destination window parameter that specifies the destination window (dstWindow) that the thumbnail is rendered to, opacity is an opacity parameter that controls the opacity of the thumbnail (e.g., set from 0 to 255) and fVisible is a visibility parameter that specifies the thumbnail as invisible or visible based on a Boolean value.

API Example 3—Unregistration of the Thumbnail

An association between the source and destination windows is removed when no longer needed. For example, if a window is no longer active, the associating between the window and the thumbnail may be accomplished by unregistering the association. This results in freeing resources. Moreover, thumbnails may further be released when the registering process exits. An example of an API for unregistering a thumbnail is DwmUnregisterThumbnail as follows:

```
HRESULT
DwmUnregisterThumbnail (
            HTHUMBNAIL hThumbnail
) ;
```

Figure 6:
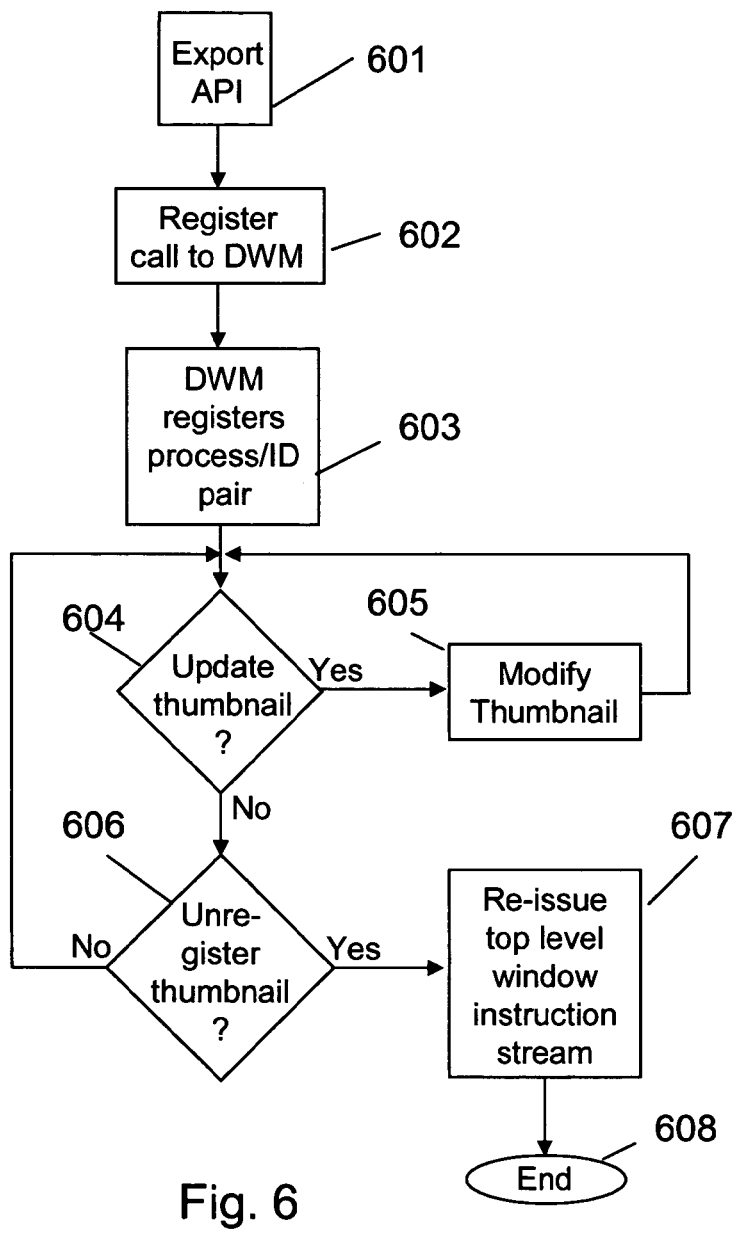
FIG. 6 is a flowchart illustrating an example of a process for providing thumbnails.

FIG. 6 is a flowchart illustrating an example of a process for providing thumbnails, including "live" or dynamic thumbnails, of the present invention. In STEP 601, an API is provided by which an application may request a first top-level window or source window to display a thumbnail, which may also be located in a section of a second top-level window or destination window. Hence, the first top-level window or source window may be rendered as the topmost object within the destination window. One non-limiting example of this implementation is an ATL-TAB window in which a thumbnail corresponding to a source window is provided within the ALT-TAB window (i.e., the destination window).

In STEP 602, a Register call is made to the DWM, which may provide the thumbnail handle. There may also be multiple calls on the same source window or the same destination window. In the ALT-TAB example, multiple calls on the same source window and same destination window results in rearrangement of the thumbnails within the ALT-TAB window as well providing a larger and/or stylized representation of a thumbnail of an application when the thumbnail is selected. In another example, the Z-order of the thumbnail may be altered by subsequent registration calls. If a modification of the z-order of the thumbnail relative to other display elements is desired, a new thumbnail may be registered with another thumbnail registration call. After properties are set for the new thumbnail that correspond to the old thumbnail, the old thumbnail may be unregistered. Thus, in this example, the z-order of the thumbnail may be changed by multiple registration of the thumbnail.

Alternatively, there may be calls to multiple source windows for the same destination window. In this example, calls to multiple source windows for one destination window results in providing multiple different thumbnails within the destination window.

In yet another example, dynamic thumbnails may be displayed within other dynamic thumbnails. For example, a first dynamic thumbnail with a higher z-order may be placed in a larger dynamic thumbnail of an application with a lower z-order. In this example, thumbnails may be embedded within other thumbnails. Further, effects may be applied to either the thumbnails or any embedded thumbnails. Alternatively, thumbnails of any z-order may be cascaded into another thumbnail of any z-order. For example, at least one thumbnail (irrespective of z-order) may be placed in a larger dynamic thumbnail of an application of any z-order. Likewise, the larger dynamic thumbnail may be placed in another dynamic thumbnail of any z-order. Thus, thumbnails may be cascaded regardless of z-order.

In STEP 603, the DWM registered the process/ID pair for the thumbnail. The DWM may further maintain a global list of thumbnail registrations in which each application is paired with a corresponding thumbnail handle (HWND). The global list may be maintained in a variety of ways depending on the needs of the user. For example, one convenient way of maintaining the global list is to index the thumbnails by destination window (dstWindow) such that any desired destination window may be efficiently accessed. Also, the thumbnails in any particular destination window may be further organized in a logical order, such as in order of overlap or based on z-order.

In another example, the DWM may "snap" the contents of a window (i.e., save the current contents of the window at the moment) prior to the window being minimized. The DWM snaps the contents of the window, for example, into a bitmap of a particular size. The size may be determined by the registration API and is an appropriate size for thumbnail mapping. After the window is minimized, the contents of the window are already preserved such that a thumbnail corresponding to the application window may still be available. Alternatively, windows that are minimized may be temporarily "parked" off-screen rather than truly minimized. In this way, the applications may continue to send information and data to update the thumbnails. Thus, if thumbnail registration occurs after an application window is "minimized," the thumbnails may still be registered and updated as if the window had not been minimized. Alternatively, thumbnails may be replaced by icons or caption bars if thumbnail registration is not feasible.

In STEP 604, updates to thumbnail properties are determined and implemented. In modifying or updating thumbnail properties, the DWM may modify the global list accordingly. For example, the DWM application may add thumbnails to its own scenegraph (e.g., FIG. 2A or FIG. 3A) in which the appropriate top-level window node that represents the target window is redrawn from the source window (i.e., sreWindow) based on additional drawing instructions.

Any further specified alterations or effects to the thumbnail may also be incorporated, for example, scaling, positioning, opacity, invisibility or special effects.

In STEP 605, the thumbnail is modified based on instructions received. For example, an UpdateThumbnail API may modify the visibility of the thumbnail node if the fVisible parameter is TRUE or the UpdateThumbnail API may increase (or decrease) the opacity of the thumbnail. After all desired modifications to the thumbnail are performed, the DWM process determines if unregistration of the thumbnail is desired. This process of determining if unregistration of the thumbnail is desired may be performed separately from the UpdateThumbnail process. In this case, unregistration may occur due to an UnregisterThumbnail API call (not shown). In STEP 606, it is determined if an unregister API is received by the DWM process. If the unregister API is received, the pairing of the process and the corresponding thumbnail ID is removed (e.g., from the global list of thumbnail registrations maintained in the DWM process). In STEP 607, the top level window instruction stream is re-issued as a result of the thumbnail being unregistered. As a result, the thumbnail is removed.

In one example, a cursor is hovered over a taskbar button resulting in the display of the thumbnail of the corresponding application. When the cursor is hovered over the taskbar button, the process creates a new top level window handle (HWND) that hosts a thumbnail. The process calls a registration API, which uses the window handle (HWND) of the application as the source of the content for the thumbnail (i.e., srcWindow). The new top level HWND that hosts the thumbnail is the destination window (dstWindow). The content from the source window, or a desired portion thereof, is then placed into the destination window to display the thumbnail. The thumbnail may contain the entire source window content or may contain only a predetermined or selected portion as set forth above. The Update Thumbnail API may modify or move the thumbnail. For example, the thumbnail may be repositioned relative to the corresponding icon or special effects may be applied to the thumbnail (e.g., transparency, invisibility, distortion, etc.). When the cursor is moved away from the taskbar button, the top level HWND hosting the thumbnail may be unregistered such that the thumbnail is hidden. Alternatively, the thumbnail may be updated to be invisible such that the thumbnail is still registered and may be subsequently invoked. In an alternative method, each window upon creation may be assigned a thumbnail created for it with the taskbar. In this example, the taskbar code may be used to manipulate the thumbnails visibility and destination rectangle for placement of the thumbnail, for example.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. One or more computer storage hardware devices storing computer-useable instructions that, when used by a computing device, cause the computing device to perform a method comprising:
  displaying a plurality of icons, each icon corresponding to an active application window;
  receiving a single input indicative of a user interacting with a first icon, the first icon corresponding to a first active application window;
  responsive to receiving the single input, displaying a plurality of thumbnails in addition to displaying the first icon, each of the plurality of thumbnails not being displayed until receiving the singe input, each thumbnail corresponding to an active application window, the plurality of thumbnails including a dynamic thumbnail containing content corresponding to content of the first active application window;
  dynamically modifying the content of the dynamic thumbnail based on modifications to the content of the first active application window;
  receiving user modifications to the content of the dynamic thumbnail; and
  modifying the content of the first active application window based on the user modifications to the content of the dynamic thumbnail.

2. The one or more computer storage hardware devices of claim 1, wherein the content of the dynamic thumbnail is modified in real-time as the content of the first active application window is modified.

3. The one or more computer storage hardware devices of claim 1, wherein the first active application window comprises a media player window, wherein the content of the media player window comprises a video being played, and wherein the content of the dynamic thumbnail corresponds to the video being played in the media player window.

4. The one or more computer storage hardware devices of claim 3, wherein the method further comprises:
  minimizing the media player window, wherein the media player window has an associated media player application that continues to play the video; and
  while the media play window is minimized, continuing to display the video in the dynamic thumbnail as the video continues to play in the media player application.

5. The one or more computer storage hardware devices of claim 1, wherein the first active application window comprises a calculator application window and the content of the dynamic thumbnail comprises a calculator corresponding with the calculator application window, wherein receiving user modifications to the content of the dynamic thumbnail comprises receiving user input to the dynamic thumbnail causing a calculation result to be presented in the dynamic thumbnail, and wherein modifying the content of the first active application window based on the user modifications to the content of the dynamic thumbnail comprises modifying the content of the first active application window to display the calculation result.

6. The one or more computer storage hardware devices of claim 1, wherein the method further comprises:
  receiving user input to minimize the dynamic thumbnail; and
  upon receipt of the user input to minimize the dynamic thumbnail, minimizing the dynamic thumbnail.

7. The one or more computer storage hardware devices of claim 1, wherein the dynamic thumbnail is displayed adjacent to the first icon.

8. The one or more computer storage hardware devices of claim 1, wherein the method further comprises:

receiving further input indicative of the user positioning the cursor over a second icon, the icon corresponding to a second active application window;

upon receipt of the input, displaying a second dynamic thumbnail containing content corresponding to content of the second active application window; and dynamically modifying the content of the second dynamic thumbnail based on modifications to the content of the second active application window.

9. The one or more computer storage hardware devices of claim 8, wherein the dynamic thumbnail and the second dynamic thumbnail are displayed simultaneously.

10. One or more computer storage hardware devices storing computer-useable instructions that, when used by a computing device, cause the computing device to perform a method comprising:

displaying a plurality of icons, each icon corresponding to an active application window;

receiving a single input indicative of a user pressing a combination of keys on a keyboard;

responsive to receiving the single input, displaying a plurality of dynamic thumbnails in addition to displaying the plurality of icons, each of the plurality of thumbnails not being displayed until receiving the single input, each dynamic thumbnail containing content corresponding to content of an active application window;

dynamically modifying the content of at least one dynamic thumbnail based on modifications to the content of a corresponding active application window;

receiving user modifications to the content of the at least one dynamic thumbnail; and modifying the content of the corresponding active application window based on the user modifications to the content of the at least one dynamic thumbnail.

11. The one or more computer storage hardware devices of claim 10, wherein the plurality of dynamic thumbnails are initially positioned based on an initial z-order associated with each dynamic thumbnail, and wherein the method further comprises changing the z-order associated with the plurality of dynamic thumbnails.

12. The one or more computer storage hardware devices of claim 10, wherein the plurality of thumbnails are cascaded.

* * * * *